(12) United States Patent
Cortright (10) Patent No.: US 7,574,665 B2
(45) Date of Patent: *Aug. 11, 2009

(54) GRAPHICALLY REPRESENTED DYNAMIC TIME STRIP FOR DISPLAYING USER-ACCESSIBLE TIME-DEPENDANT DATA OBJECTS

(75) Inventor: David S. Cortright, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 10/888,103

(22) Filed: Jul. 9, 2004

(65) Prior Publication Data

US 2004/0243942 A1 Dec. 2, 2004

Related U.S. Application Data

(63) Continuation of application No. 09/753,260, filed on Dec. 29, 2000, now Pat. No. 6,828,989.

(51) Int. Cl.
*G06F 3/00* (2006.01)
(52) U.S. Cl. .................... 715/768; 715/963
(58) Field of Classification Search .......... 715/769, 715/963, 768, 786, 835, 784
See application file for complete search history.

(56) References Cited

U.S. PATENT DOCUMENTS

| | | | | |
|---|---|---|---|---|
| 5,805,444 A | * | 9/1998 | Seymour | 700/16 |
| 6,199,199 B1 | * | 3/2001 | Johnston et al. | 717/107 |
| 6,335,730 B1 | * | 1/2002 | Gould | 715/784 |
| 6,512,529 B1 | * | 1/2003 | Janssen et al. | 715/790 |
| 6,522,347 B1 | * | 2/2003 | Tsuji et al. | 715/848 |

* cited by examiner

*Primary Examiner*—Kieu D Vu
(74) *Attorney, Agent, or Firm*—Lyon & Harr, LLP; Mark A. Watson (57) ABSTRACT

The invention provides graphically representing time dependent information or data objects in a sequential manner using a dynamic time strip having implicit or explicit indications of time. The dynamic time strip is a linear graphical strip comprising graphical representations of time dependent information elements or data objects which may or may not include text or markers to indicate the time (i.e. second, minute, hour, day and/or date) along the length of the strip. As time passes, and data objects are changed, added or removed from the time strip, the time strip is automatically and dynamically updated to reflect these changes along with showing the passage of time. The period of time represented by the dynamic time strip is preferably one day, with the dynamic time strip automatically scrolling forward as time passes. However, in one embodiment, the period of time represented by the dynamic time strip is user configurable.

41 Claims, 5 Drawing Sheets

GRAPHICALLY REPRESENTED DYNAMIC TIME STRIP FOR DISPLAYING USER-ACCESSIBLE TIME-DEPENDANT DATA OBJECTS

CROSS REFERENCE TO RELATED APPLICATIONS

This application is a Continuation Application of U.S. patent application Ser. No. 09/753,260, filed on Dec. 29, 2000 by David Cortright, and entitled "GRAPHICALLY REPRESENTED DYNAMIC TIME STRIP FOR DISPLAYING USER-ACCESSIBLE TIME-DEPENDENT DATA OBJECTS".

BACKGROUND

1. Technical Field

The invention is related to a system and process for graphically representing sequential time-dependent information or data objects on a display device.

2. Related Art

By way of background, a typical personal information manager (PIM) allows users to manage their daily schedule, upcoming tasks, and contact information. Traditionally, a PIM provides one mutually exclusive view for each type of data. For example, a calendar application or program may be used to display the users' schedule data, while an email client may be used to list sent, received, or forwarded email messages. The problem is that because both the schedule data and the email message data are both typically important to the user, the user is forced to frequently switch between these applications. One solution to this problem is to reduce the size of windows displaying different information, and then to display such information side by side on a single screen. Similarly, a user can attach a second monitor or display device to a computer and display the separate application windows on each monitor. However, as more and more programs are used for displaying time-dependant information or data, attempting to show each of these programs simultaneously becomes overly complicated and thus effectively unworkable. Consequently, the user is left to switch between applications.

One conventional PIM has attempted to address such problems by providing an integrated scheduling or calendar program with an email client in a single application window. However, this PIM only provides the number of unread email messages in the same view as the scheduling information, without providing access to the email messages, or any specific information relating to the unread email messages. Further, this PIM does not provide access to any other types of time-dependant information that may be of interest to the user.

Therefore, what is needed is a system and method for graphically representing or displaying available time-dependant information in a single view, in a sequential order based on a time or times associated with that information. In addition, to avoid the need to switch between applications, the system and method should provide the capability to simultaneously graphically represent time-dependant information from at least program or application. Further, again to avoid the need to switch between applications, the system and method for graphically representing time-dependant information should minimize the amount of space required to display such information.

SUMMARY

The present invention involves a new system and process for graphically representing time dependent information or data objects in a sequential manner using a dynamic time strip having implicit or explicit indications of time. In particular, the dynamic time strip is a linear graphical strip comprising graphical representations of time dependent information elements or data objects, from one or more data stores, such as, for example, an application, an electronic database, or a separate program. These data objects may or may not include text or markers to indicate the time (i.e. second, minute, hour, day and/or date) along the length of the strip. As time passes, and data objects are changed, added or removed from the time strip, either automatically or through user interaction, the time strip is automatically and dynamically updated to reflect these changes along with showing the passage of time. The period of time represented by the dynamic time strip is preferably one day, with the dynamic time strip automatically scrolling forward as time passes. However, in one embodiment, the period of time represented by the dynamic time strip is user configurable.

The text or markers for indicating time along the time strip may be regularly spaced, or may be tied to each individual data object. Further, while the time dependent data objects are displayed in a sequential manner, in one embodiment, the time strip is not linear with respect to time. For example, where several data objects are spaced equally in time, i.e. one hour apart, and a next sequential data object is spaced one day later, the time strip displays the later data object immediately following the earlier data objects to avoid large gaps in the dynamic time strip. However, an indication of a discontinuity in the time strip is preferably displayed between the earlier and later data objects, such as by showing a graphical representation of a break in the strip between the data objects, or by visually indicating the time associated with the data objects.

The time dependent information or data objects represent items such as, for example, pre-scheduled events such as meetings, appointments, tasks, events, phone calls, birthdays, holidays, milestones, deadlines, etc., sent or received emails, computer files that have been created, opened, edited, printed, or otherwise accessed, or any other item that has an associated time. For example, where the data object represents an event such as a scheduled meeting, the time associated with the data object would be a start time for the meeting. Similarly, where the data object represents sent or received email, the time associated with the data object would be the time that the email was actually sent or received. Further, some data objects may have multiple times or a duration or period of time associated with them. For example, a data object representing a scheduled meeting may have both a start and an end time associated with it. A data object such as this can be displayed using distinct graphical representations, such as, for example, shading or other graphics, that cover an area on the strip equal to the time during which that data object will occur. Data objects overlapping partially or completely in time are preferably displayed side by side along the dynamic time strip.

In one embodiment, the appearance of the graphical representation of data objects is dependent upon a pre-defined category (either explicitly by the user or implicitly by logic built into the software) for the data object. For example, where the data objects represent scheduled events, individual events are color coded, shaded, or represented by a picture or icon depending upon the type of event. Specifically, using the example of scheduled events, a scheduled meeting can be represented by a red area on the dynamic time strip, while a scheduled lunch date can be represented by a blue area on the dynamic time strip. Clearly, any number of categories may be used with any type of data object, with each category associated with any desired color, shape, shading, picture, or icon. These categories, and the associated graphical representation, are preferably pre-defined, but in one embodiment, the categories and associated graphical representations are user-definable.

The graphical representations of data objects on the dynamic time strip are preferably active such that if a user moves a mouse, or other computer pointing device, over any graphically represented data object, a summary of that data object is automatically displayed in a pop-up window or some other mechanism for conveying more detailed information about that data object to the user. In one embodiment, the user may edit the data displayed in the summary window. Similarly, in another embodiment, if a user clicks on, or otherwise selects a graphically represented data object, the data represented by the data object is opened for the user to view and/or edit using whatever computer application is associated with that data object. For example, where a data object represents an email message that has been sent, received, printed, forwarded, etc., clicking on that data object will serve to open the associated email message in an email program or client.

In a further embodiment, a user may edit, extend or compress a time or time frame associated with a data object by simply selecting an edge of a graphically represented data object and moving that edge, using conventional techniques, either forward or backward along the timeline represented by the dynamic time strip. Similarly, in another embodiment, the user may simply drag and drop data events along the dynamic time strip. Such actions serve to automatically adjust the time or times associated with the data object in accordance with the location along the time strip where the user dropped the data object. Further, in one embodiment, the graphically represented data object, or an edge of the graphically represented data object will automatically snap to the nearest prescribed time interval when the user either drags and drops or moves an edge of the graphically represented data object. For example, if the user places either the graphically represented data object, or an edge of the graphically represented data object at a point along the length of the dynamic time strip corresponding to 1:03 PM, the graphically represented data object will automatically snap to 1:00 PM. The granularity of the snap capability is preferably predefined, but in one embodiment is user configurable.

In another embodiment, the dynamic time strip itself is active such that if a user clicks on, or otherwise selects the time strip, the user can add, edit, or delete data objects on the time strip. For example, clicking on a portion of the time strip not having a graphically represented data object will allow the user to add a new data object entry at the time corresponding to the location on the time strip where the user clicked. In addition, the period of time covered by the time strip may be expanded or compressed by simply selecting one end of the dynamic time strip and moving that end, using conventional techniques, either forward or backward in time to either expand or compress the period of time represented by the dynamic time strip. Also, in one embodiment, a capability for scrolling backward or forward through the timeline represented by the dynamic time strip is provided. Consequently, a user can review or preview the state of the dynamic time strip either in the past or future by simply scrolling in the appropriate direction along the dynamic time strip. Again, a snap capability, as described above, may be associated with this capability. In this context, the snap capability ensures that the display of the dynamic time strip starts and stops at predefined increments of time.

In a further embodiment, the dynamic time strip will automatically generate an alert or reminder, such as, for example an audio and/or visual alert, for data objects requiring user action or intervention at specific times. Examples of such an alert or reminder is an audio or visual alert to remind a user that the time for a scheduled meeting is near, that a response to a received email message is due, or that a project deadline or milestone is approaching.

The dynamic time strip is preferably shown along one or more edges of a program window so as to minimize the space used by the strip. However, in one embodiment, the dynamic time strip is semi-transparent and can be placed anywhere within a program window. In such an embodiment, the strip can either remain semi-transparent, so as to avoid obscuring the application within which it is displayed, or alternately, it can automatically become either more or less transparent, or not transparent at all as a user moves a mouse or other computer pointing device away from, towards or over any portion of the dynamic time strip. In another embodiment, the dynamic time strip is coded as an independent application, daemon, extension, or system service that remains visible from within whatever program window is currently active.

In a working example of the present invention, the time strip represents a calendar of scheduled events. Consequently the data objects in the working example represent time dependent events such as meetings, appointments, events, project deadlines, birthdays, etc. In this example, where the user places the mouse or other pointing device over one of the events along the time strip, a popup window indicating pertinent information such as, for example, start time, end time, location of event, name or names of contacts, phone numbers, etc. Further, as described above, the user may also click directly on an event to open and/or edit the event. Specifically, a conventional calendar program may be tied to the time strip, such that events on the calendar are automatically displayed on the time strip. Changing entries or events within the calendar program causes the time strip to be dynamically updated. Similarly, changing entries or events directly within the time strip, as described above, causes the data within the calendar program to be dynamically updated.

In this working example, the graphical representations of data objects (i.e. events) on the dynamic time strip are preferably illustrated using colored or shaded rectangles proportional in length to the time frame delineated by a start and stop time for each event with respect to a time line scale represented by the dynamic time strip. Further, for events having only start times, a fixed size rectangle is preferably used. As described above, the appearance of the graphical representation of events is dependent upon a pre-defined or user defined category for each event.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
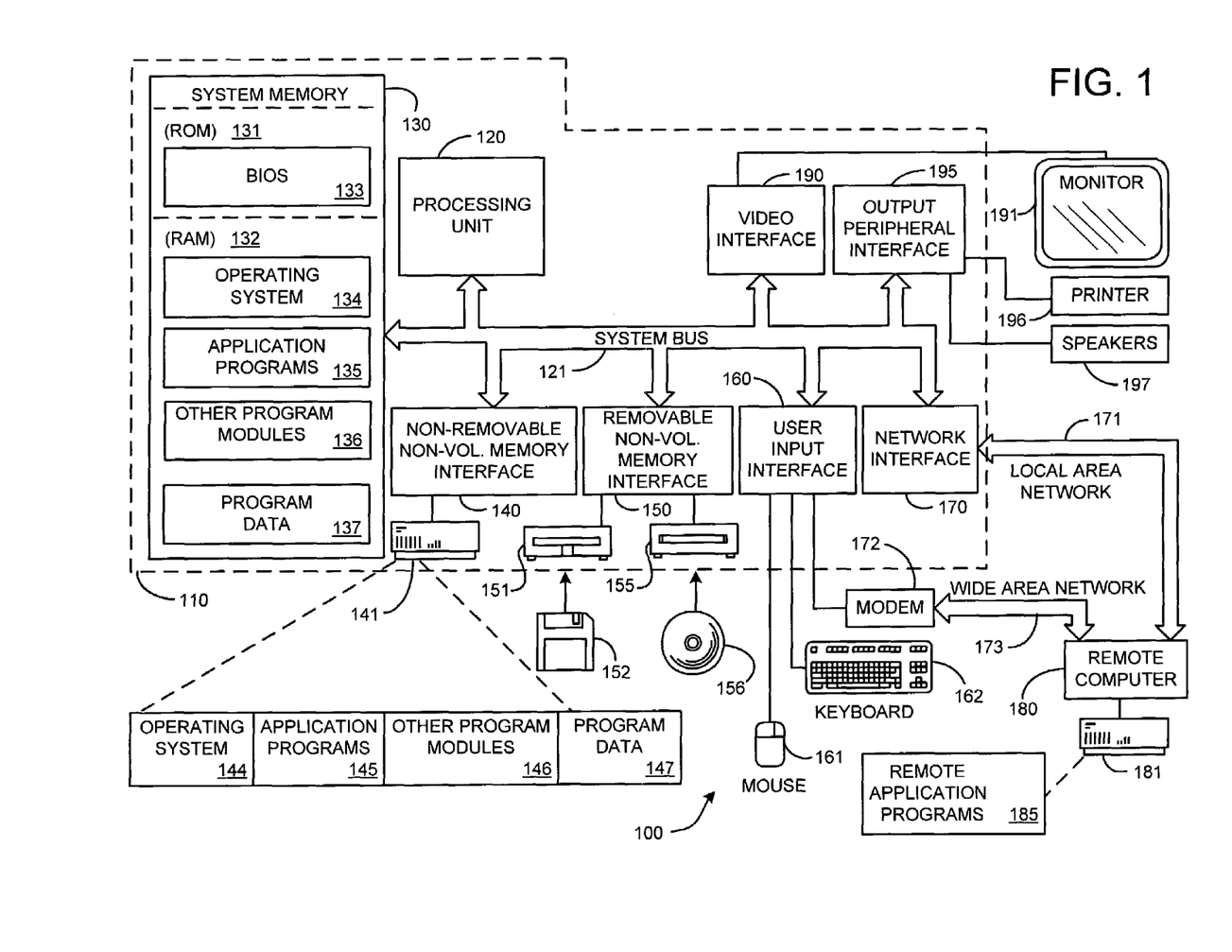
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention. The program modules associated with dynamically displaying time dependent information or data objects using a linear time strip will be described first in reference to the system diagram of FIG. 2. In addition, the processes for dynamically displaying time dependent data objects using the time strip will be described with reference to the flow diagram of FIG. 3, and the exemplary user interface of FIG. 4. Finally, a working example will be discussed with reference to the exemplary screen image of FIG. 5.

System Overview:

A dynamic time strip according to the present invention is a linear graphical strip comprising graphical representations of time dependent information elements or data objects, from at least one data store, such as, for example, an application, an electronic database, or a separate program. These data objects may or may not include text or markers to indicate the time (i.e. second, minute, hour, day and/or date) along the length of the strip. The text or markers for indicating time along the time strip may be regularly spaced, or may be tied to each individual data object. Further, the indications of time may be implicit or explicit. As time passes, and data objects are changed, added or removed from the time strip, either automatically or through user interaction via a user interface, as described in detail below, the time strip is automatically and dynamically updated, again as described in further detail below, to reflect these changes along with showing the passage of time. The period of time represented by the dynamic time strip is preferably one day, with the dynamic time strip automatically scrolling forward as time passes. However, in one embodiment, the period of time represented by the dynamic time strip is user configurable, and can span any desired time interval.

In one embodiment, the appearance of the graphical representation of data objects is dependent upon a pre-defined category (either explicitly by the user or implicitly by logic built into the software) for the data object. For example, where the data objects represent scheduled events, individual events are color coded, shaded, or represented by a picture or icon depending upon the type of event. Specifically, using the example of scheduled events, a scheduled meeting can be represented by a red area on the dynamic time strip, while a scheduled lunch date can be represented by a blue area on the dynamic time strip. Clearly, any number of categories may be used with any type of data object, with each category associated with any desired color, shape, shading, picture, or icon. These categories, and the associated graphical representation, are preferably pre-defined, but in one embodiment, the categories and associated graphical representations are user-definable.

By way of example, the time dependant data objects displayed via the time strip are, in a basic sense, variables for holding time dependant information such as is typically seen in a conventional scheduling, task, or calendar programs, or with information relating to other electronic files or data having an associated time. Examples of such time dependant information includes, for example, pre-scheduled events such as meetings, appointments, tasks, events, phone calls, birthdays, holidays, milestones, deadlines, etc., sent or received emails, computer files that have been created, opened, edited, printed, or otherwise accessed, or any other item that has an associated time. For example, where the data object represents an event such as a scheduled meeting, the time associated with the data object would be a start time for the meeting. Similarly, where the data object represents sent or received email, the time associated with the data object would be the time that the email was actually sent, received, read, printed, or forwarded. Further, some data objects may have multiple times or a duration or period of time associated with them. For example, a data object representing a scheduled meeting may have both a start and an end time associated with it. Such data object are displayed using distinct graphical representations, such as, for example shading or other graphics, that cover an area on the strip equal to the time period during which that data object is scheduled to occur. Further, using the email example above, the email could have associated times for any or all of the times that the email was sent, received, read, printed, and/or forwarded.

As discussed above, in one embodiment, the time strip employs implicit indications of time. Such implicit indications of time include simply arranging the data objects in order of the time associated with each data object. For example, data objects may be arranged from left to right, right to left, top to bottom, or bottom to top, depending upon the orientation and direction of scrolling of the time strip as time passes. Consequently, a first data object is implicitly earlier than a second data object, which is implicitly earlier than a third data object, and so on. Further, with respect to explicit indications of time, the time strip may include specific textual or graphical representations of time, i.e. a graphical or textual clock or textual time, day, and or date, to indicate specific times or periods of time spaced at regular intervals along the length of the dynamic time strip. Alternately, the time strip may include such explicit indications of time in association with each data object displayed on the dynamic time strip. Further, other explicit indications of time include using markings, such as, for example, lines, geometric shapes, or shading, gradients, or color changes either along the length of the time strip, or in association with each data object displayed on the dynamic time strip. Such explicit markings are used for indicating relative time intervals or periods, such as minutes, hours, days, etc.

The time strip is linear in the geometric sense in that it graphically represents a sequential row of time dependent data objects. Consequently, the time strip may be wide, narrow, curved, straight, or any combination thereof, so long as it is linear. However, the time strip, while linear in the geometric sense, is not necessarily linear in the temporal sense. Specifically, in one embodiment, while the time dependent data objects are displayed in a sequential manner the time strip is not linear with respect to time. For example, where several data objects are spaced equally in time, i.e. one hour apart, and a next sequential data object is spaced one day later, the time strip displays the later data object immediately following the earlier data objects to avoid large gaps in the dynamic time strip. Further, in a related embodiment, an indication of a discontinuity in the time strip is displayed between the earlier and later data objects, such as by showing a graphical representation of a break in the strip between the data objects, or by visually indicating the time associated with the data objects. Further, data objects overlapping partially or completely in time are preferably displayed either physically overlapping or side by side along the dynamic time strip.

The dynamic time strip is preferably displayed along one or more edges of a display window or program window so as to minimize the space used by the strip. However, in one embodiment can be placed anywhere within a window by simply dragging and dropping the time strip via the user interface using conventional techniques. Further, in a related embodiment, the dynamic time strip is semi-transparent so as to avoid obscuring the application or window within which it is displayed as it is moved about within the application or window. Alternately, the time strip can automatically become either more or less transparent, or not transparent at all, as a user moves a mouse or other computer pointing device away from, towards or over any portion of the dynamic time strip. In another embodiment, the dynamic time strip is coded as an independent application that remains visible from within whatever program window is currently active.

Figure 2:
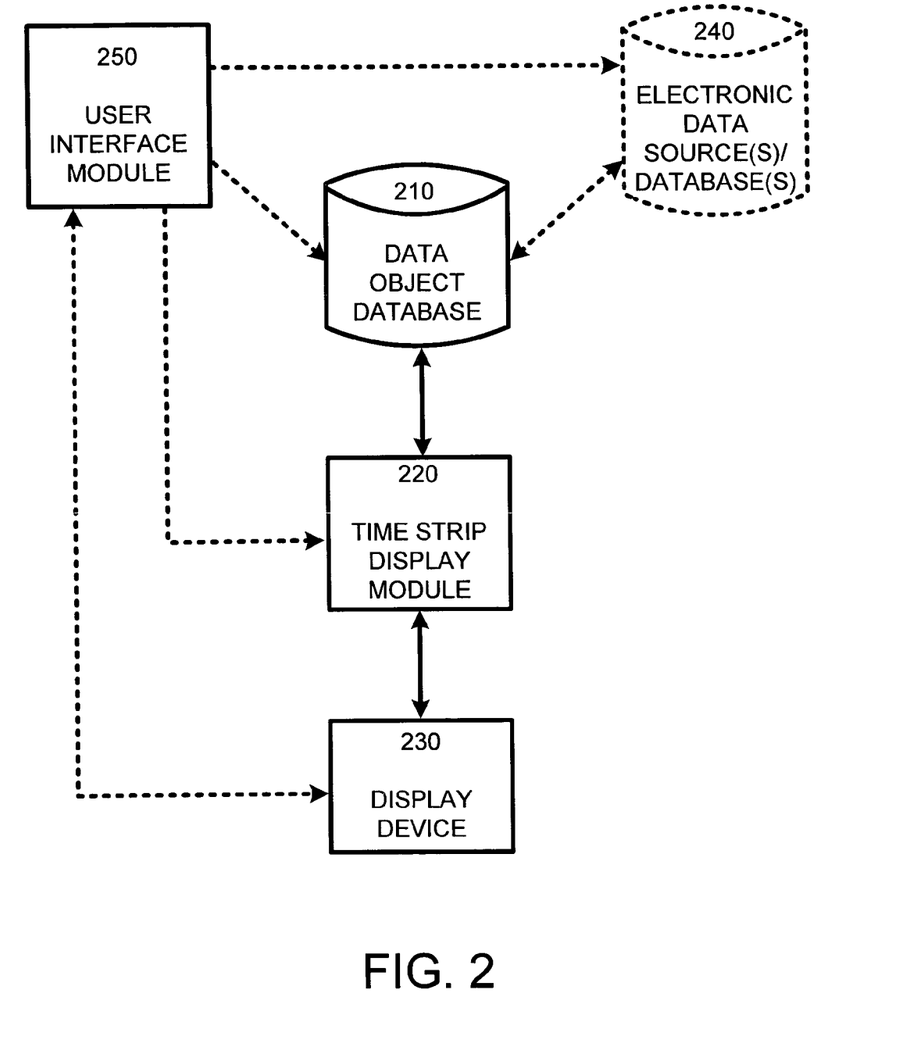
FIG. 2 is a system diagram that depicts exemplary program modules employed in a system for dynamically displaying time-dependant data objects in accordance with the present invention.

FIG. 2 is a general system diagram illustrating program modules used for dynamically displaying time dependent information or data objects using the dynamic linear time strip. It should be noted that the boxes and interconnections between boxes that are represented by broken or dashed lines in FIG. 2 represent alternate embodiments of the present invention, and that any or all of these alternate embodiments, as described throughout this document, may be used in combination.

In general, a system and process according to the present invention uses the program modules illustrated in FIG. 2 to automatically and dynamically display time dependent data objects from a data object database 210 by using a time strip display module 220 to dynamically display the data objects in the time strip on a conventional display device 230. The time dependent data objects are preferably maintained in the data object database 210, but in one embodiment, the time dependent data objects are automatically retrieved from one or more electronic data sources or databases 240 using conventional techniques.

Further, in one embodiment, a user interface 250 allows a user to manipulate time dependent data objects within the data object database 210, such as by editing existing data objects, entering new data objects, or deleting existing data objects using conventional techniques. Similarly, in another embodiment, the user interface 250 allows a user to manipulate time dependent data objects within any other electronic data sources or databases 240, such as by editing existing data objects, entering new data objects, or deleting existing data objects, again using conventional techniques.

The time strip display module 220 retrieves the time dependent data objects from the data object database 210. The time strip display module 220 then sorts the data objects in order of time, i.e. sequentially, using any of a number of conventional sorting techniques. Next, the time strip display module 220 automatically and dynamically populates the time strip with the sequential data objects, and provides the populated time strip to the display device 230 for display. Once the time strip has been displayed, the time strip display module 220 automatically and dynamically updates the displayed time strip and/or layout of the data objects displayed within the time strip as time passes, or as data objects are added, edited or deleted as described in further detail below.

In additional embodiments, the appearance of the dynamic time strip, as well as the data objects displayed in the time strip, are configured via the user interface 250. Specifically, in one embodiment, the user is provided with the capability to adjust the period of time represented by the dynamic time strip via the user interface 250. Further, the user may also interact with the dynamic time strip via the user interface 250. Each of these embodiments is described in further detail below, along with additional examples of alternate features provided via the user interface 250.

Operation:

The above-described program modules are employed to dynamically display time dependent data objects via the dynamic linear time strip using the exemplary process that will now be described. This process is depicted in the flow diagram of FIG. 3 which represents an exemplary method for implementing the time strip display module 220 of the present invention, as shown in FIG. 2. It should be noted that the boxes and interconnections between boxes that are represented by broken or dashed lines in FIG. 3 represent alternate embodiments of the present invention, and that any or all of these alternate embodiments, as described below, may be used in combination.

Figure 3:
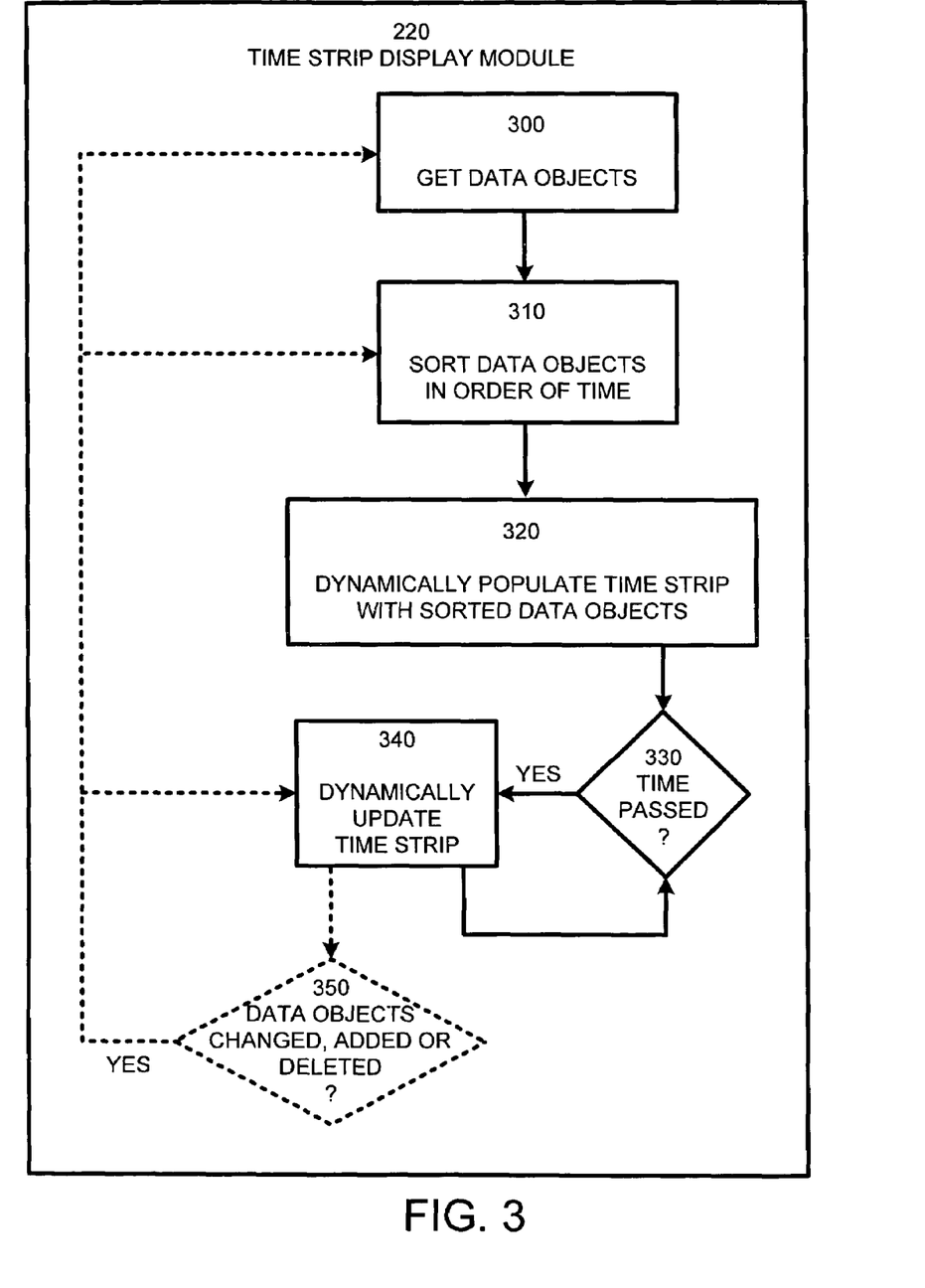
FIG. 3 is an exemplary flow diagram for dynamically displaying time-dependant data objects in accordance with the present invention.

Referring now to FIG. 3 in combination with FIG. 2, the process is started by retrieving data objects (Box 300) from the data object database 210, or from other electronic data sources or databases 240 as described above. Once the data objects have been retrieved, they are sorted in a sequential order (Box 310) as described above. Once the data objects are sorted, the time strip display module 220 determines which of the data objects correspond to the period of time represented by the dynamic time strip, and then dynamically populates the time strip with the sorted data objects (Box 320). For example, where the dynamic time strip represents a twenty-four hour period, the earliest time period represented by the time strip is the current time, while the latest time represented by the time strip is the same time as the current time on the following day. Consequently, the time strip is dynamically populated (Box 320) with all data objects having an associated time or times falling between the earliest time and the latest time represented by the time strip.

Next, as time passes (Box 330), the time strip is dynamically updated (Box 340). For example, as time passes, the time strip scrolls forward in time to keep pace with the passing time. Specifically, in one embodiment, the time strip automatically scrolls forward continuously as time passes such that the earliest time represented by the time strip is always the current time. In another embodiment, the time strip scrolls forward after a predetermined increment of time has passed. For example, the time strip can be set to scroll forward in time after an increment of time, such as, for example, a 30-second, 1-minute, 5-minute, 15-minute, or 30-minute interval, etc. has passed. Clearly, any desired time increment can be used for automatic scrolling of the time strip. Consequently, in this embodiment, the earliest time represented by the time strip will lag the current time by as much as the scrolling time increment. In either embodiment, when automatically scrolling forward in time, dynamically updating the time strip (Box 340) comprises removing data objects from the time strip once all times associated with those data objects are earlier than the earliest time represented by the time strip. Similarly, dynamically updating the time strip (Box 340) further comprises adding data objects to the time strip once any times associated with those data objects are earlier than the latest time represented by the time strip.

Further, as discussed above, in one embodiment, where data objects are changed, added or removed from the time strip (Box 350), either automatically or through user interaction, the time strip is automatically and dynamically updated (Box 340) to reflect these changes. However, depending upon whether a data object is changed, either with respect to information content or associated time, different actions are required before the dynamic time strip is dynamically updated (Box 340).

For example, where a data object represents a scheduled meeting having a given start time, and wherein the data object further comprises information relating to a location for that meeting, the data object may be changed, either automatically or via the user interface 250, to reflect a new location for the meeting. In this case, the position of the data object within the time strip remains unchanged. Thus, the time strip is dynamically updated (Box 340) by simply updating the information represented by the data object within the time strip. However, where any times associated with the data object are changed, either automatically or via the user interface 250, the data objects are again sorted in order of time (Box 310), as described above. Then, as described above, the time strip is dynamically populated with the sorted data objects (Box 320). Finally, also as described above, the time strip is dynamically updated (Box 340) to reflect the passage of time (Box 330).

Similarly, where data objects are added to either the data object database 210 or other electronic data sources or databases 240, either automatically or via the user interface 250, the added data objects are retrieved as described above (Box 300). Next, again as described above, the data objects are sorted in order of time (Box 310). Then, as described above, the time strip is dynamically populated with the sorted data objects (Box 320). Finally, also as described above, the time strip is dynamically updated (Box 340) to reflect the passage of time (Box 330).

Where data objects are deleted from either the data object database 210 or from other electronic data sources or databases 240, either automatically or via the user interface 250, the deleted data objects are simply removed from the time strip by dynamically updating the time strip (Box 340). Finally, also as described above, the time strip is dynamically updated (Box 340) to reflect the passage of time (Box 330).

Figure 4:
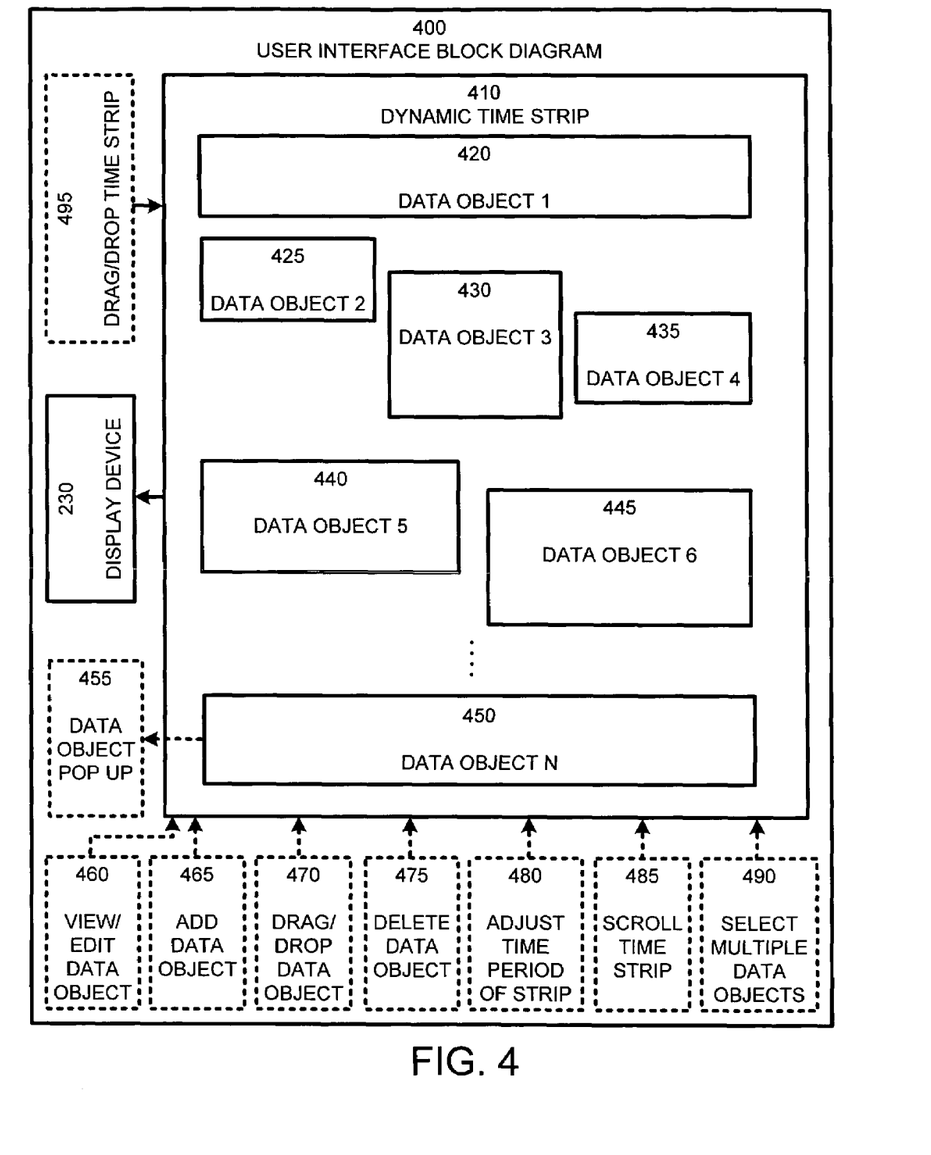
FIG. 4 is an exemplary block diagram of a user interface for interacting with dynamically displayed time-dependant data objects in accordance with the present invention.

Exemplary User Interface:

The block diagram of FIG. 4 illustrates an exemplary user interface for implementing the user interface module 250 of FIG. 2 in accordance with the system and method of the present invention. Specifically, with reference to FIG. 4, the user interface 400 allows for user interaction with the dynamic time strip 410 in accordance with the present invention.

As illustrated by FIG. 4, the user interface 400 is implemented on a computer display device 230 using conventional techniques. The user interface 400 includes the time strip 410 which is automatically and dynamically populated with graphically represented data objects 420 through 450. Specifically, as described above, the data objects, 420 through 450, are sorted in order of time and displayed on the time strip 410. As described above, where data objects have fully or partially overlapping times, i.e. data objects 425, 430 and 435, the data objects are graphically represented on the time strip 410 as fully or partially overlapping in time by either graphically overlapping the data objects, or by placing the data objects side by side as illustrated in FIG. 4.

The graphical representations of data objects 420 through 450 on the dynamic time strip 410 are preferably active such that if a user moves a mouse, or other computer pointing device, over a graphically represented data object 450, a summary of that data object is automatically displayed in a pop-up window 455 or other conventional mechanism for conveying more detailed information about that data object to the user. Further, in one embodiment, the user may edit the data summarized in the pop-up window 455. In this embodiment, as changes are made to the data object 450, the time strip 410 is dynamically updated as described above.

Similarly, in another embodiment, if a user clicks on, or otherwise selects a graphically represented data object, the data represented by the data object is opened for the user to view and/or edit 460 using whatever computer application is associated with that data object. Again, as changes are made to the data object 450, the time strip 410 is dynamically updated as described above. For example, where a data object represents an email message that has been sent, received, printed, forwarded, etc., clicking on that data object will serve to open the associated email message in an email program or client, where the message can again be sent, forwarded, printed, etc. thereby causing any times associated with the data object to be updated, thereby causing the time strip 410 to be dynamically updated as described above.

Further, a time or time frame associated with a data object is edited or adjusted 460 via the user interface 400 by simply selecting an edge of a graphically represented data object and moving that edge, using conventional techniques, either forward or backward along the timeline represented by the dynamic time strip. Further, in a related embodiment, the graphically represented data object, or an edge of the graphically represented data object will automatically snap to a nearest prescribed time interval when the user either drags and drops or moves an edge of the graphically represented data object. For example, if the user places either the graphically represented data object, or an edge of the graphically represented data object at a point along the length of the dynamic time strip corresponding to 1:03 PM, the graphically represented data object will automatically snap to 1:00 PM. The granularity of the snap capability is preferably predefined at any desired interval, such as, for example, 1-minute, 5-minute, or 10-minute intervals, etc., but in one embodiment is user configurable.

Further examples of additional embodiments of the user interface 400 include the capability to add data objects 465 to the time strip 410. Data objects are added to the time strip 410 in one of several ways.

First, in one embodiment, data objects are added to the time strip by simply dragging and dropping data objects, or electronic files representing such data objects, onto the time strip using conventional techniques. If times are already associated with such dragged and dropped data objects, the data objects are automatically displayed within the time strip 410 as described above. For example, if the dragged and dropped data object has an associated start time, the data object will be displayed along the time strip 410 in a position corresponding to that start time, so long as the start time of the data object is equal to or later than the earliest time represented by the time strip, and equal to or earlier than the latest time represented by the time strip. Similarly, in another embodiment, the user moves existing data objects 420 through 450 along the time strip 410 by simply dragging and dropping such data objects along the dynamic time strip. Such actions serve to automatically adjust the time or times associated with the data object in accordance with the location along the time strip where the data object is dropped by the user.

Next, in another embodiment, data objects are added to the time strip by first adding data objects to the data object database (210 or 240 of FIG. 2). Once such data objects are added, the time strip 410 is automatically updated as described above to reflect the added data objects. Data objects are added to the databases either manually via the user interface, or automatically. One example of automatically adding data objects, wherein the data objects are used for representing information relevant to email, occurs when an email is sent, received, forwarded, printed, etc. As described above, such emails have one or more associated times. Consequently, where the time strip includes data objects representing such email messages, those data objects are automatically added to the data object database (210 or 240 of FIG. 2) as soon as they are sent, received, forwarded, printed, etc. The time strip 410 is then dynamically updated to reflect the addition of such data objects.

Further, as described above, in one embodiment data objects may be deleted 475 from the time strip 410 via the user interface 400. In such an embodiment, the time strip is simply updated to reflect the deletion as described above. Data objects are deleted using conventional techniques, such as, for example, using a delete button or the equivalent to delete one or more selected data objects, deletion via a context sensitive menu associated with each data object, or simply dragging a data object off of the dynamic time strip.

In still another embodiment, the period of time covered by the time strip 410 is adjustable 480, i.e., expanded or compressed, by simply selecting one end of the dynamic time strip and dragging that end, using conventional techniques, either forward or backward in time to either expand or compress the period of time represented by the dynamic time strip. Alternately, the period of time covered by the time strip 410 is adjusted 480 via a context sensitive menu associated with the time strip.

In another embodiment, a capability for scrolling backward or forward through the timeline 485 represented by the dynamic time strip 410 is provided via the user interface 400. Consequently, a user can review or preview the state of the dynamic time strip either in the past or future by simply scrolling in the appropriate direction along the dynamic time strip. The time strip 410 is dynamically updated to either add or remove data objects, as described above, based upon the earliest and latest times represented by the time strip as the user scrolls either forward or backward in time. In a related embodiment, a snap capability, as described above, is associated with this scrolling embodiment. In this context, the snap capability ensures that the display of the dynamic time strip 410 starts and stops at predefined increments of time.

In a further embodiment, the dynamic time strip 410 is itself active such that if a user clicks on, or otherwise selects the time strip, the user can add, edit, or delete data objects on the time strip via a pop-up menu or other context sensitive menu. For example, clicking on a portion of the time strip 410 not having a graphically represented data object will allow the user to add a new data object entry at the time corresponding to the location on the time strip where the user clicked. Similarly, clicking on a portion of the time strip 410 having a graphically represented data object, i.e. any of 420 through 450, will allow the user to edit or delete that data object as described above.

Finally, as described above, in one embodiment, the dynamic time strip 410 is movable via the user interface 400, and can be placed anywhere within a window by simply dragging and dropping the time strip 495 via the user interface using conventional techniques. Further, as discussed above, in a related embodiment, the time strip is semi-transparent so as to avoid obscuring the application or window within which it is displayed after being moved about within the application or window.

In another embodiment, the user may select multiple data objects 490 on the dynamic time strip using conventional techniques, such as, for example, by using Shift or Command key modified-clicks on sequential objects, or by drag selecting using marquee style selection. The user can then select any of the aforementioned actions to perform on the selected objects, such as, for example, delete or move.

Figure 5:
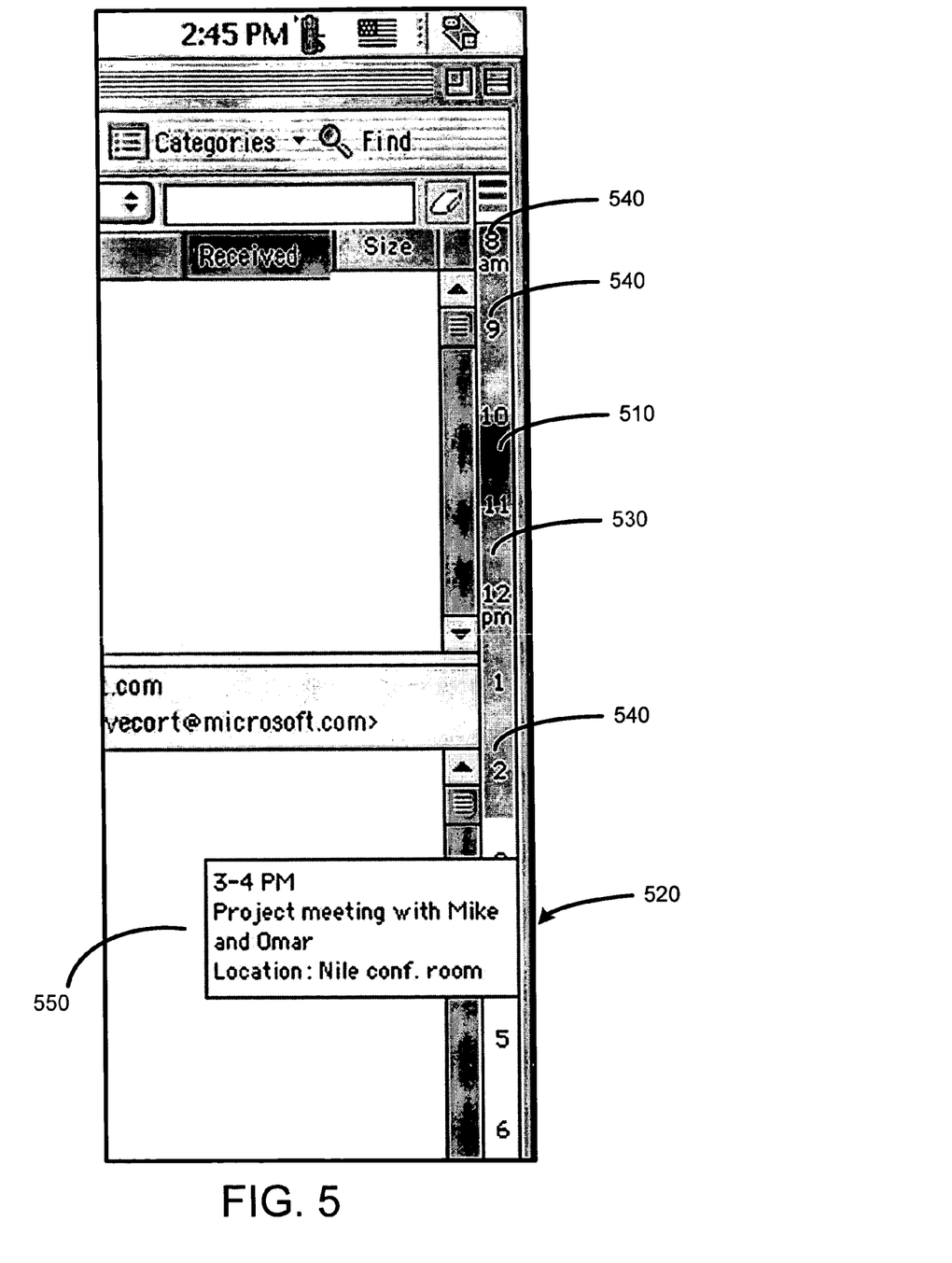
FIG. 5 is a screen image showing an exemplary implementation of a working example according to the present invention.

Working Example:

In a working example of the present invention, as illustrated by the screen image of FIG. 5, an exemplary system and method for dynamically displaying time-dependent data objects 510 and 520 in a dynamic time strip 530 is embodied in a calendar of scheduled events. Consequently the data objects 510 and 520 in this working example represent time dependent events such as meetings, appointments, events, project deadlines, birthdays, etc. As can be seen from FIG. 5, the time strip 530 is a narrow linear strip along the right edge of an application window. Further, in this working example, explicit indications of time 540, beginning at 8:00 am, and regularly spaced at one-hour intervals, are provided for the time strip 530.

Note that FIG. 5 shows a first data object 510 (i.e. a scheduled event) as represented by a darker shaded area from 10:00 am to 11:00 am. Similarly, although obscured by a pop-up window 550, a second data object 520 representing a scheduled meeting from 3:00 pm to 4:00 pm is illustrated by another shaded area. Further, also as illustrated by FIG. 5 and as described above, where the user places the mouse or other pointing device over the data object 520, the popup window 550 appears. This pop-up window 550 provides pertinent information such as, for example, the start time, end time, names of contacts and location of the meeting. Additionally, as described above, the user may also click directly on an event to open and/or edit the event, i.e. 510 or 520, using whatever application may be associated with the data object in question.

Specifically, in this working example, a conventional calendar program is tied to the time strip 530, such that events within the calendar are automatically displayed on the time strip 530. Changing entries or events within the calendar program causes the time strip 530 to be dynamically updated as described above. Similarly, changing entries or events directly within the time strip 530, as described above, causes the data within the calendar program to be dynamically updated.

Further, in this working example, the graphical representations of data objects (i.e. events) 510 and 520 on the dynamic time strip 530 are preferably illustrated using colored or shaded rectangles proportional in length to the time frame delineated by a start and stop time for each event with respect to a time line scale represented by the dynamic time strip. Further, for events having only start times, a fixed size rectangle is preferably used. As described above, the appearance of the graphical representation of events is dependent upon a pre-defined or user defined category for each event.

As described above, each of the data objects 510 and 520 displayed along the time strip 530 has at least one associated time, as well as associated information. Consequently, as described above, the display of data objects 510 and 520 representing the time strip 530 automatically changes dynamically as data displayed within the time strip is changed, or as data objects are added to or removed from the either the time strip, or the data object database or other electronic databases.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for graphically displaying data objects on a computer display device, comprising:
    providing a dynamic display area represented by a dynamic time strip, said dynamic time strip including one or more indications of time along the length of the dynamic time strip;
    populating the dynamic time strip with one or more graphically represented data objects, wherein each of the data objects used to populate the dynamic time strip has at least one associated time falling within an overall time period represented by the dynamic time strip, and is positioned within the dynamic time strip relative to the at least one associated time,
    updating the dynamic time strip to reflect a passage of time by automatically scrolling the dynamic time strip forward in time as time passes and automatically updating the population and position of the data objects within the time strip to correspond to the overall time period represented by the dynamic time strip; and
    providing a user interface for interacting with the dynamic time strip and one or more data objects by user selection of an area on the dynamic time strip not currently including a graphically represented data object.

2. The system of claim 1 wherein the dynamic time strip automatically generates an alert for data objects requiring user action at a specific time.

3. The system of claim 2 wherein the alert is a pop-up window for displaying information associated with data objects requiring user action at a specific time.

4. The system of claim 3 wherein the alert further includes an audible alert for alerting the user to data objects requiring user action at a specific time.

5. The system of claim 1, wherein the dynamic time strip is curved.

6. The system of claim 5 wherein the curved dynamic time strip forms a closed curve.

7. The system of claim 6 wherein the closed curve of the dynamic time strip forms a circle, with one or more indications of time disposed along the length of the circular dynamic time strip.

8. The system of claim 7 wherein the graphically represented data objects used to populate the circular dynamic time strip are represented by shaded segments corresponding to predetermined object types, and covering periods of time along the length of the circular time strip corresponding to a predetermined time and duration for each data object.

9. The system of claim 1 wherein the dynamic time strip is persistent such that it remains visible from within whatever application is currently active on the computer display device.

10. The system of claim 1 wherein the user interface for interacting with the dynamic time strip includes a capability to open a user selectable database of data objects.

11. The system of claim 1 wherein the user interface for interacting with the dynamic time strip includes a capability to add data objects to the dynamic time strip, said added data objects including at least one associated time.

12. The system of claim 1 wherein the user interface for interacting with the dynamic time strip includes a capability to delete data objects from the dynamic time strip.

13. The system of claim 1 wherein the graphically represented data object represent information including any of: pre-scheduled events, sent and received email messages, and electronic files having at least one associated time.

14. The system of claim 1 wherein at least one pop-up window for displaying data represented by any one or more graphically represented data objects is displayed by user selection of the graphical representation of those data objects.

15. The system of claim 1 wherein user selection of any one or more graphically represented data objects serves to open each selected data object in an application associated with each selected data object.

16. The system of claim 1 wherein at least one time associated with any graphically represented data object is adjustable via the user interface.

17. The system of claim 1 wherein at least one time associated with any graphically represented data object is automatically adjusted by dragging the graphically represented data object to a new position along the length of the dynamic time strip.

18. The system of claim 1 wherein the overall time period represented by the dynamic time strip is scrollable via a user interface.

19. The system of claim 17 wherein the population of data objects within the dynamic time strip is automatically updated as the dynamic time strip is scrolled.

20. The system of claim 1 wherein the dynamic time strip is semi-transparent.

21. The system of claim 20 wherein an amount of transparency of the dynamic time strip changes in direct relation to the motion of a computer pointing device with respect to the semi-transparent dynamic time strip.

22. A physical computer-readable medium having computer executable instructions stored thereon for dynamically displaying time-dependant data objects on a computer display device, said computer executable instructions comprising:
retrieving one or more temporally sorted data objects from at least one electronic database, each data object providing a graphical representation of time dependant information having at least one associated time;
dynamically displaying the data objects within a persistent dynamic time strip on a computer display device, wherein only those data objects having any times falling within a total time period currently represented by the persistent dynamic time strip are displayed;
said persistent dynamic time strip remaining visible on the computer display device from within whatever application is currently active on the computer display device;
updating the persistent dynamic time strip to reflect the passage of time by automatically scrolling the dynamic time strip forward in time as time passes;
providing a user interface for interacting with the persistent dynamic time strip and the data objects displayed therein; and
wherein the user interface includes a capability for moving a position of the persistent dynamic time strip to any desired location within the computer display device.

23. The computer-readable medium of claim 22 wherein updating the persistent dynamic time strip to reflect the passage of time further comprises updating the dynamically displayed the data objects within the persistent dynamic time strip such that only those data objects having any times falling within the total time period currently represented by the dynamic time strip are displayed.

24. The computer-readable medium of claim 22 wherein the persistent dynamic time strip automatically generates a user alert for data objects requiring user action at a specific time, said user alert including a pop-up window for displaying information associated with data objects requiring user action at a specific time.

25. The computer-readable medium of claim 24 wherein the alert further includes an audible alert.

26. The computer-readable medium of claim 22 wherein the persistent dynamic time strip is curved, said curve being closed.

27. The computer-readable medium of claim 26 wherein the closed curve of the persistent dynamic time strip forms a circle, and wherein the graphically represented data objects used to populate the circular persistent dynamic time strip are represented as segments of the circular persistent dynamic time strip.

28. The computer-readable medium of claim 22 wherein the user interface further includes a capability to add data objects to the persistent dynamic time strip.

29. The computer-readable medium of claim 22 wherein the user interface further includes a capability to delete data objects from the persistent dynamic time strip.

30. The computer-readable medium of claim 22 wherein at least one pop-up window for displaying data represented by any one or more data objects is displayed by user selection of those data objects.

31. The computer-readable medium of claim 22 wherein user selection of any one or more data objects serves to open each selected data object in an application associated with each selected data object.

32. The computer-readable medium of claim 22 wherein the total time period currently represented by the persistent dynamic time strip is adjustable via the user interface.

33. The computer-readable medium of claim 22 wherein the persistent dynamic time strip is semi-transparent, and wherein the amount of transparency changes in direct relation to the motion of a computer pointing device relative to the persistent dynamic time strip.

34. A computer-implemented process for automatically displaying time-dependant information on a computer display device, comprising:
retrieving one or more temporally sorted data objects from at least one electronic database of data objects, wherein the data objects represent time dependant information having at least one associated time;
displaying graphical representations of the temporally sorted data objects within a dynamic time strip, said dynamic time strip representing a user adjustable time period, and including one or more indications of time along the length of the dynamic time strip;
updating the dynamic time strip and the included indications of time to reflect the passage of time by scrolling the dynamic time strip forward in time as time passes;
providing a user interface for interacting with the dynamic time strip and one or more data objects;
said user interface including a capability for opening one or more selected data objects within corresponding applications associated with each data object upon user selection of those data objects; and
wherein the dynamic time strip remains visible on the computer display device from within whatever application is currently active on the computer display device.

35. The computer-implemented process of claim 34 wherein the user interface further includes a capability for opening and displaying the contents of the at least one database of data objects by user selection of a portion of the dynamic time strip not including a graphical representation of the sequentially sorted data objects.

36. The computer-implemented process of claim 34 wherein the dynamic time strip is semi-transparent, and wherein the amount of transparency changes relative to the motion of a computer pointing device relative to the position of dynamic time strip.

37. The computer-implemented process of claim 34 further comprising automatically generating a pop-up window alert for displaying information associated with data objects requiring user action at a specific time.

38. The computer-implemented process of claim 34 wherein the dynamic time strip is curved into a circular area within the computer display device.

39. The computer-implemented process of claim 38 wherein one or more of the graphical representations of data objects displayed within the dynamic time strip are represented as individual segments within the circular area of the dynamic time strip.

40. The computer-implemented process of claim 39 wherein individual segments corresponding to the graphical representations of data objects within the circular area of the dynamic time strip are any of color coded, shaded, and represented by a picture, depending upon a type of event associated with each data object.

41. The computer-implemented process of claim 34 wherein the user interface further includes a capability for moving a position of the dynamic time strip within the computer display device.

* * * * *